United States Patent
Sato et al.

(10) Patent No.: US 12,483,169 B2
(45) Date of Patent: Nov. 25, 2025

(54) SYNCHRONOUS MOTOR DRIVING DEVICE AND SYNCHRONOUS MOTOR DRIVING METHOD

(71) Applicant: Hitachi Astemo, Ltd., Hitachinaka (JP)

(72) Inventors: Hiroaki Sato, Tokyo (JP); Daisuke Goto, Hitachinaka (JP); Katsuya Iwasaki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 116 days.

(21) Appl. No.: 18/578,108

(22) PCT Filed: Jun. 1, 2022

(86) PCT No.: PCT/JP2022/022343
§ 371 (c)(1),
(2) Date: Jan. 10, 2024

(87) PCT Pub. No.: WO2023/026625
PCT Pub. Date: Mar. 2, 2023

(65) Prior Publication Data
US 2024/0322724 A1    Sep. 26, 2024

(30) Foreign Application Priority Data
Aug. 27, 2021    (JP) .................. 2021-138652

(51) Int. Cl.
*H02P 21/22* (2016.01)
*B60T 13/74* (2006.01)

(52) U.S. Cl.
CPC ............. *H02P 21/22* (2016.02); *B60T 13/74* (2013.01); *H02P 2207/05* (2013.01)

(58) Field of Classification Search
CPC ........ H02P 21/22; H02P 2207/05; H02P 6/16; B60T 13/74
See application file for complete search history.

(56) References Cited

U.S. PATENT DOCUMENTS 9,461,574 B2 * 10/2016 Gebregergis ............ H02P 21/22
10,526,008 B1 *  1/2020 Li ........................... H02P 6/08
(Continued)

FOREIGN PATENT DOCUMENTS

| JP | 2012-175770 A | 9/2012 |
| JP | 2013-233062 A | 11/2013 |
| JP | 2016-113111 A | 6/2016 |

OTHER PUBLICATIONS

International Search Report, PCT/JP2022/022343, Aug. 9, 2022, 2 pgs.

*Primary Examiner* — Thai T Dinh
(74) *Attorney, Agent, or Firm* — Volpe Koenig (57) ABSTRACT

A synchronous motor driving device which accurately estimates and limits direct current (DC), without a dedicated current detection sensor. The device includes a first DC calculation unit that calculates a first DC based on a first voltage command value, a current value of a winding of a synchronous motor, and a battery voltage; a second DC calculation unit that calculates a second DC based on a current value of the winding of the synchronous motor, a rotation speed of the synchronous motor, and a predetermined motor characteristic; a model error extraction unit calculating inverter efficiency based on the first and second DC; a DC correction unit that calculates an estimated DC on the basis of the first and second DC, and the inverter efficiency; and a DC limiting unit that corrects a current command value of the winding based on the estimated DC and a predetermined DC limit value.

8 Claims, 4 Drawing Sheets

(56) References Cited

U.S. PATENT DOCUMENTS

| | | | |
|---|---|---|---|
| 10,700,629 B2* | 6/2020 | Campbell | H02P 21/02 |
| 11,424,706 B2* | 8/2022 | Li | H02P 29/032 |
| 2010/0264860 A1* | 10/2010 | Jun | H02P 21/18 |
| | | | 318/400.02 |
| 2021/0152112 A1 | 5/2021 | Li et al. | |

* cited by examiner

SYNCHRONOUS MOTOR DRIVING DEVICE AND SYNCHRONOUS MOTOR DRIVING METHOD

TECHNICAL FIELD

The present invention relates to a configuration of a driving device for driving and controlling a synchronous motor and to control thereof, and particularly relates to technology which is effective when applied to an electric brake motor of an automobile, which requires high responsiveness and high reliability.

BACKGROUND ART

In recent years, advances have been made in the electrification of auxiliary components such as the steering wheel and brake units of an automobile. Because a conventional hydraulic system can be eliminated through electrification of auxiliary components, improved maintainability and improvements in automobile operability and controllability are expected. In a motorized auxiliary machine of this kind, generally, DC power of an auxiliary battery is converted into AC power by a power conversion device such as an inverter, and actuators of the steering wheel and the brakes and the like are operated by driving a synchronous motor.

In a case where important parts of an automobile such as the steering wheel and the brakes are motorized, a redundant configuration is desirable so that driving can be continued even when an electric component such as a synchronous motor or an inverter fails. For example, by changing the motor from a conventional three-phase winding to a multiple three-phase winding and providing multiple inverters, the operation is continued even if failure occurs.

Meanwhile, there is a limit to the electric power that can be supplied from the auxiliary battery, and the electric power consumed by the steering and the braking may be determined in the vehicle design. In such cases, measures may be taken so that the direct current outputted from the auxiliary battery does not exceed the limit value.

As a countermeasure to the foregoing problem, there is a method, as per Patent Literature 1, for example, in which a sensor for detecting a direct current is provided, and in a case where the direct current exceeds a limit value, the inverter output is reduced to limit the output of the direct current.

CITATION LIST

Patent Literature

PTL 1: JP 2012-175770 A

SUMMARY OF INVENTION

Technical Problem

Patent Literature 1 discloses a technique in which a battery state is detected using a sensor or the like and a synchronous motor is controlled based on the battery state to allocate power from the battery.

However, because additional configurations such as a sensor or a hardware filter are required, there is a risk of causing an increase in cost and an increase in device size.

In addition, in the above-described multiple winding structure, it is necessary to provide a sensor in each winding system, which leads to a further increase in cost.

As one possible method for limiting the direct current while preventing an increase in cost, there is a method, constituting generally known technology, in which active power is calculated from the output voltage and the output current of an inverter, and the active power is divided by a battery voltage to obtain the direct current.

However, because the efficiency of the inverter is not taken into account, a direct current estimation error occurs, and therefore the direct current cannot be appropriately estimated and may exceed the limit value.

Therefore, an object of the present invention is to provide a highly reliable synchronous motor driving device that is capable of highly accurately estimating and limiting a direct current, without the need for an additional configuration such as a dedicated current detection sensor, and a synchronous motor driving method using same.

Solution to Problem

In order to solve the foregoing problems, the present invention includes a first direct current calculation unit that calculates a first direct current on the basis of a first voltage command value, a current value of a winding of a synchronous motor, and a battery voltage; a second direct current calculation unit that calculates a second direct current on the basis of a current value of the winding of the synchronous motor, a rotation speed of the synchronous motor, and a predetermined motor characteristic of the synchronous motor; a model error extraction unit that calculates inverter efficiency on the basis of the first direct current and the second direct current; a direct current correction unit that calculates an estimated direct current on the basis of the first direct current, the second direct current, and the inverter efficiency; and a direct current limiting unit that corrects a current command value of the winding on the basis of the estimated direct current and a predetermined direct current limit value.

The present invention further includes the steps of: (a) calculating a first direct current on the basis of a first voltage command value, a current value of a winding of a synchronous motor, and a battery voltage; (b) calculating a second direct current on the basis of a current value of the winding of the synchronous motor, a rotation speed of the synchronous motor, and a predetermined motor characteristic of the synchronous motor; (c) calculating inverter efficiency on the basis of the first direct current and the second direct current; (d) calculating an estimated direct current on the basis of the first direct current, the second direct current, and the inverter efficiency; and (e) correcting a current command value of the winding on the basis of the estimated direct current and a predetermined direct current limit value.

Advantageous Effects of Invention

According to the present invention, it is possible to realize a highly reliable synchronous motor driving device that is capable of highly accurately estimating and limiting a direct current, without the need for an additional configuration such as a dedicated current detection sensor, and a synchronous motor driving method using same.

As a result, it is possible to contribute to improvements in the reliability of a synchronous motor and automobile electric brakes whereon the synchronous motor is mounted while suppressing an increase in cost.

Problems, configurations, advantageous effects other than those described above will be clarified by the following descriptions of the embodiments.

DESCRIPTION OF EMBODIMENTS

Hereinafter, embodiments of the present invention will be described with reference to the drawings. Note that, in the drawings, the same constituent elements are denoted by the same reference signs, and detailed descriptions of duplicate constituent elements are omitted.

Furthermore, the descriptions and drawings hereinbelow are examples to illustrate the present invention, and omissions and simplifications are made, as appropriate, to clarify the invention. The present invention can also be carried out in various other forms. Unless otherwise specified, each constituent element may be singular or plural.

First Embodiment

A synchronous motor driving device according to a first embodiment of the present invention and a synchronous motor driving method using same will be described with reference to FIGS. 1 to 5. Note that FIG. 4 is a diagram of a direct current from a conventional synchronous motor driving device, which is illustrated to facilitate understanding of the advantageous effects of the present invention.

Figure 1:
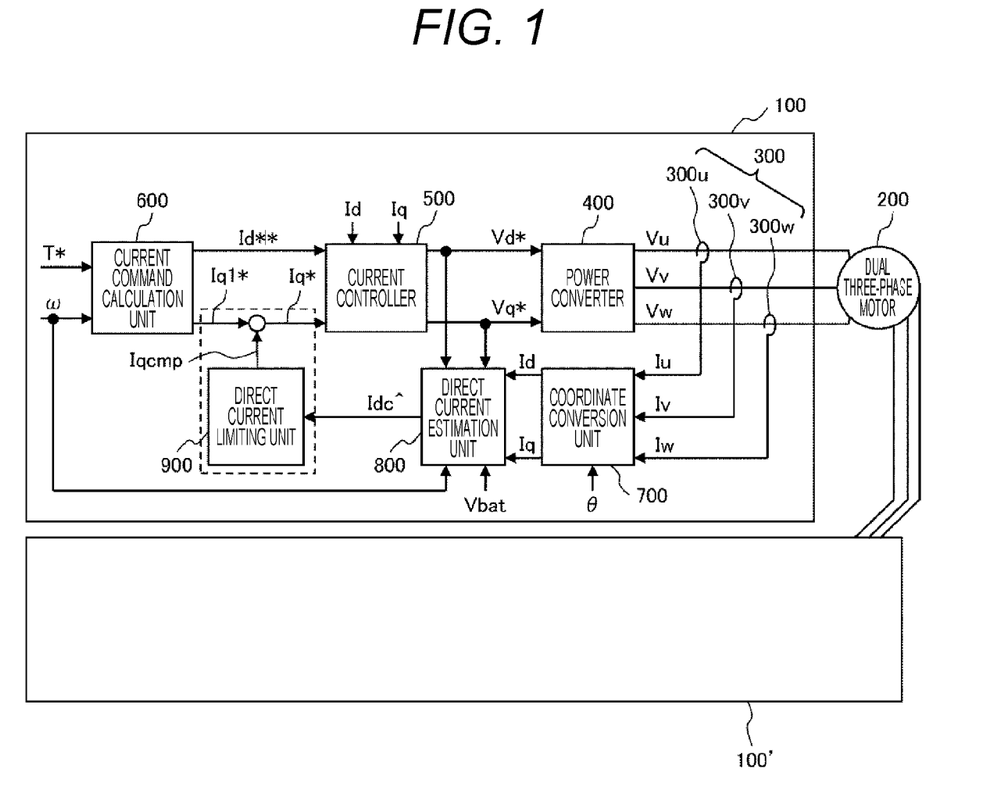
FIG. 1 is a block diagram illustrating a primary function of a synchronous motor driving device according to a first embodiment of the present invention.

FIG. 1 is a functional block diagram of a synchronous motor driving device 100 according to the present embodiment.

As illustrated in FIG. 1, the synchronous motor driving device 100 according to the present embodiment includes, as a main configuration, a current detection unit 300, a power converter 400, a current controller 500, a current command calculation unit 600, a coordinate conversion unit 700, a direct current estimation unit 800, and a direct current limiting unit 900, and drives a synchronous motor 200.

The synchronous motor 200 is, for example, a permanent magnet-type synchronous motor, and is configured using a permanent magnet (ferromagnetic body) as the rotor and using an armature winding as the stator. Note that, in the present embodiment, the synchronous motor 200 is a dual three-phase winding motor, and is configured including two three-phase windings.

The synchronous motor driving device 100 supplies AC power to one dual three-phase winding of the dual three-phase windings. Further, a synchronous motor driving device 100' having the same configuration as the synchronous motor driving device 100 is provided, and the synchronous motor driving device 100' supplies AC power to the other three-phase winding to drive the dual three-phase winding motor.

The current detection unit 300 includes current sensors 300u, 300v, and 300w that detect three-phase currents flowing through the synchronous motor 200. The current sensors 300u, 300v, and 300w are arranged in the respective phases of the synchronous motor 200. The current detection unit 300 detects the currents Iu, Iv, and Iw and outputs the currents to the coordinate conversion unit 700.

Note that, although an example in which the current sensors 300u, 300v, and 300w are arranged in each phase of the synchronous motor 200 is illustrated, the current sensors may be arranged only in two phases (for example, the u-phase and the v-phase) by utilizing the fact that the sum of the symmetrical three-phase alternating currents is zero. Furthermore, a configuration in which the three-phase current of the synchronous motor 200 is obtained from the current flowing through the DC bus (not illustrated) of the power converter 400 may be adopted. With these configurations, the number of current sensors can be reduced, and cost reduction can be achieved.

The power converter 400 is, for example, an inverter, and performs on/off control of a semiconductor switching element of the power converter 400 on the basis of voltage commands Vd* and Vq* from the current controller 500 when the synchronous motor 200 is driven, and applies the voltages Vu, Vv, and Vw to the synchronous motor 200 to drive the synchronous motor 200.

The current controller 500 receives a motor d-axis current command Id* from the current command calculation unit 600, a q-axis current command Iq*, which is outputted from the direct current limiting unit 900, and a d-axis current Id and a q-axis current Iq, which are outputted from the coordinate conversion unit 700, and performs control so that Id and Iq coincide with the command values Id* and Iq*.

For example, the configuration is a combination of generally known PI control and non-interference control. The foregoing control is performed, and Vd* and Vq*, which are d- and q-axis voltage commands respectively, are outputted and transmitted to the power converter 400.

The current command calculation unit 600 determines a d-axis current command Id* and a first q-axis current command Iq1* for driving the synchronous motor 200, on the basis of a torque command T*, which is a host control (not illustrated) output, and a rotation speed ω of the synchronous motor 200.

For example, a determination is made on the basis of a lookup table prepared by calculating the characteristics of the synchronous motor 200 in advance or a mathematical model of the synchronous motor 200. Id*, which is an output of the current command calculation unit 600, is transmitted to the current controller 500, and Iq1*, which is another output, is inputted to the direct current limiting unit 900 described below.

The coordinate conversion unit 700 coordinate-converts the three-phase currents Iu, Iv, and Iw of the synchronous motor 200 into a d-axis current Id and a q-axis current Iq. For this conversion, rotational coordinate conversion is performed using the electrical phase e of the synchronous motor 200. Id and Iq, which are outputs of the coordinate conversion unit 700, are transmitted to the direct current estimation unit 800 and the current controller 500, the direct current estimation unit 800 uses Id and Iq to estimate the direct current as described below, and the current controller 500 uses the Id and Iq to calculate the d- and q-axis voltage commands Vd* and Vq* respectively.

The direct current estimation unit 800 takes, as inputs, the d-axis current Id and the q-axis current Iq from the coordinate conversion unit 700, the d-axis voltage command Vd* and the q-axis voltage command Vq* from the current controller 500, a battery voltage Vbat, and the rotation speed ω of the synchronous motor 200, and calculates Idc^, which is an estimated value for the direct current. In addition, the Idc^ thus calculated is transmitted to the direct current limiting unit 900.

The direct current limiting unit 900 takes, as an input, Idc^, which is an estimated value for the direct current, and calculates a q-axis current compensation value Iqcmp. In addition, by adding the first q-axis current command Iq1* calculated by the current command calculation unit 600, the q-axis current is compensated, and the direct current is limited or the output is increased.

Figure 2:
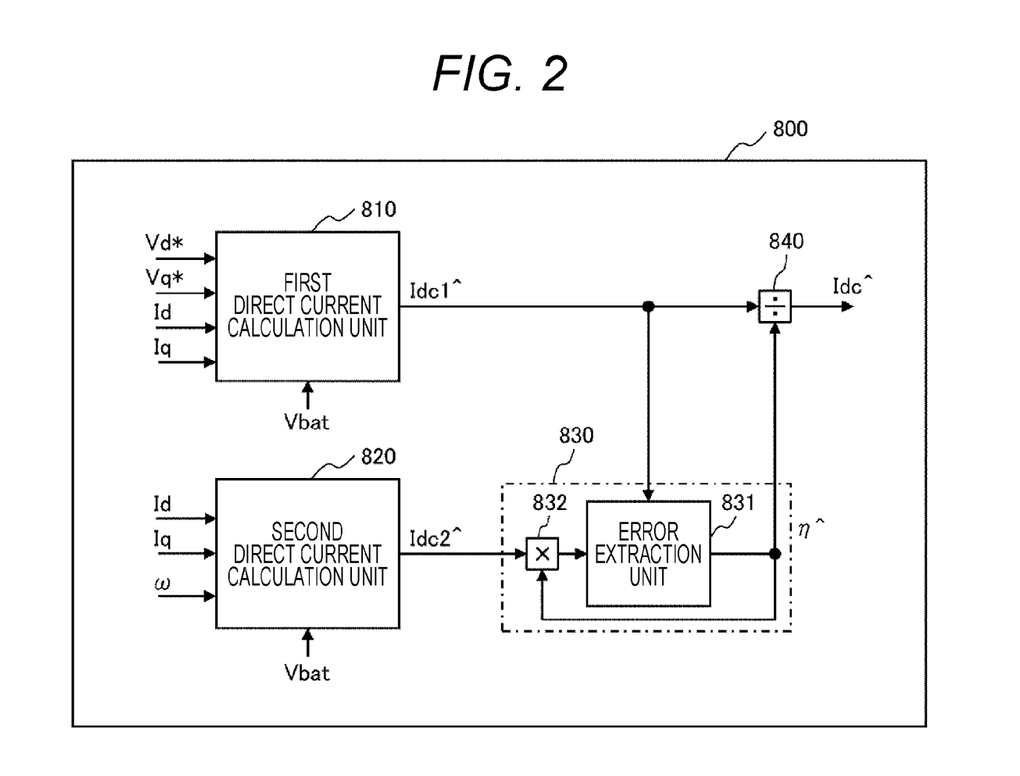
FIG. 2 is a block diagram illustrating a primary function of a direct current estimation unit in FIG. 1.

FIG. 2 is a functional block diagram of the direct current estimation unit 800 in FIG. 1.

The direct current estimation unit 800 includes a first direct current calculation unit 810, a second direct current calculation unit 820, a model error extraction unit 830, and a direct current correction unit 840.

The first direct current calculation unit 810 takes, as inputs, the d-axis voltage command Vd*, the q-axis voltage command Vq*, the d-axis current Id, the q-axis current Iq, and the battery voltage Vbat, and calculates a first direct current Idc1^.

The first direct current Idc1^ is calculated using, for example, a generally known Equation (1).

$$Idc1\,\hat{}\, = (Vd^* \times Id + Vq^* \times Iq)/Vbat \quad (1)$$

Equation (1) yields the first direct current Idc1^ on the basis of the balance between the product of the direct current, which is the input power of the inverter, and the direct voltage, and the inner product of the voltage, which is the output voltage of the inverter, and the current.

Incidentally, in a power converter such as an inverter, energy loss due to power conversion generally occurs, and thus, the output power of the inverter becomes smaller than the input power. Therefore, the actual direct current is expressed by Equation (2), which takes into account the inverter efficiency.

$$Idc = (Vd^* \times Id + Vq^* \times Iq)/Vbat/\eta \quad (2)$$

Because the inverter efficiency is not taken into account in the generally known Equation (1), an error always occurs. If the inverter efficiency η is measured in advance, the direct current can be accurately obtained, but because the inverter efficiency changes according to the operating voltage, the current, or the temperature, it is difficult to measure the inverter efficiency in advance.

Therefore, the present embodiment is configured to include a second direct current calculation unit 820, a model error extraction unit 830, and a direct current correction unit 840.

The second direct current calculation unit 820 takes, as inputs, the d-axis current Id, the q-axis current Iq, the motor rotation speed ω, and the battery voltage Vbat, and calculates a second direct current Idc2^. The second direct current calculation unit 820 is, for example, a block that calculates a direct current on the basis of motor characteristics, and uses Equations (3), (4), and (5) in the present embodiment.

$$Vd\,\hat{}\, = R \times Id - \omega Lq Iq \quad (3)$$

$$Vq\,\hat{}\, = R \times Iq + \omega Ld Id + \omega \Phi \quad (4)$$

$$Idc2\,\hat{}\, = (Vd^\wedge \times Id + Vq^\wedge \times Iq)/Vbat \quad (5)$$

Here, R is a winding resistance value of the synchronous motor 200, Ld and Lq are d-axis inductance, q-axis inductance, respectively, and Φ is an interlinkage magnetic flux of a permanent magnet of the synchronous motor 200.

In Equations (3) and (4), the input voltage of the synchronous motor 200 is calculated using the motor model. In Equation (5), the second direct current Idc2^ is obtained using the input voltage found by Equations (3) and (4), the d-axis current Id, and the q-axis current Iq.

Equations (3) to (5) calculate the ideal direct current without considering the inverter.

The model error extraction unit 830 includes an error extraction unit 831 and an error correction unit 832, takes, as inputs, the first direct current Idc1^ and the second direct current Idc2^, and corrects and, based on these values, calculates inverter efficiency information η^.

The error correction unit 832 takes, as inputs, the second direct current Idc2^ and the inverter efficiency information η^, calculates Equation (6), and transmits the calculation result of Equation (6) to the error extraction unit 831.

$$Idc2^\wedge \times \eta^\wedge \quad (6)$$

The error extraction unit 831 takes, as inputs, the first direct current Idc1^ and the output of the error correction unit 832, and outputs the inverter efficiency information η^.

The error extraction unit 831 according to the present embodiment uses Equation (7) to calculate the inverter efficiency information η^ and outputs same.

$$\eta\,\hat{}\, = (\eta^\wedge \times Idc2^\wedge - Idc1^\wedge)/s \quad (7)$$

Here, s is a Laplace operator.

From the relationship between Equations (1) and (2), the first direct current Idc1^ is obtained by multiplying the actual direct current Idc by the inverter efficiency η. That is, it is a value including information on the inverter efficiency η.

On the other hand, the second direct current Idc2^ is an ideal direct current which is based on the motor model representing the characteristics of the synchronous motor 200 and which does not take into account the inverter efficiency.

By extracting only the information on the inverter efficiency η from the first direct current Idc1^ including the information on the inverter efficiency η and the second direct current Idc2^ not including the information on the inverter efficiency η, the direct current can be accurately obtained.

The inverter efficiency information η^, which is an output of the model error extraction unit 830, is transmitted to the direct current correction unit 840.

The direct current correction unit 840 takes, as inputs, the first direct current Idc1^ and the inverter efficiency information η^, and calculates Idc^, which is an estimated value for the direct current. In the present embodiment, the calculation is performed according to Equation (8).

$$Idc\hat{} = Idc1\hat{}/\eta\hat{} \qquad (8)$$

Figure 3:
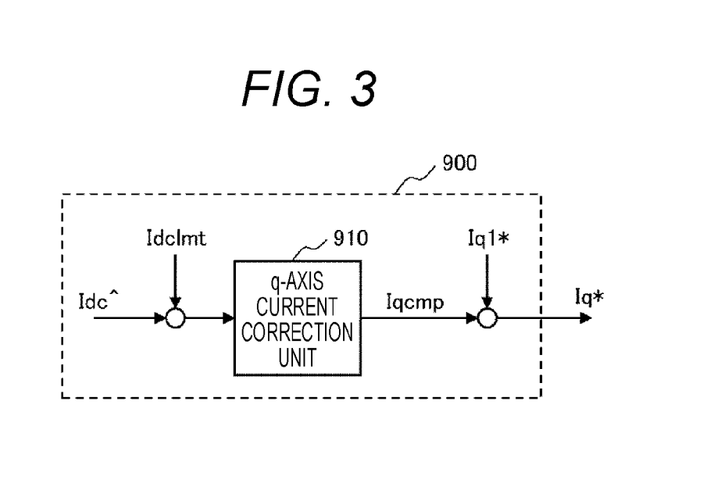
FIG. 3 is a block diagram illustrating a primary function of the direct current limiting unit in FIG. 1.
Figure 4:
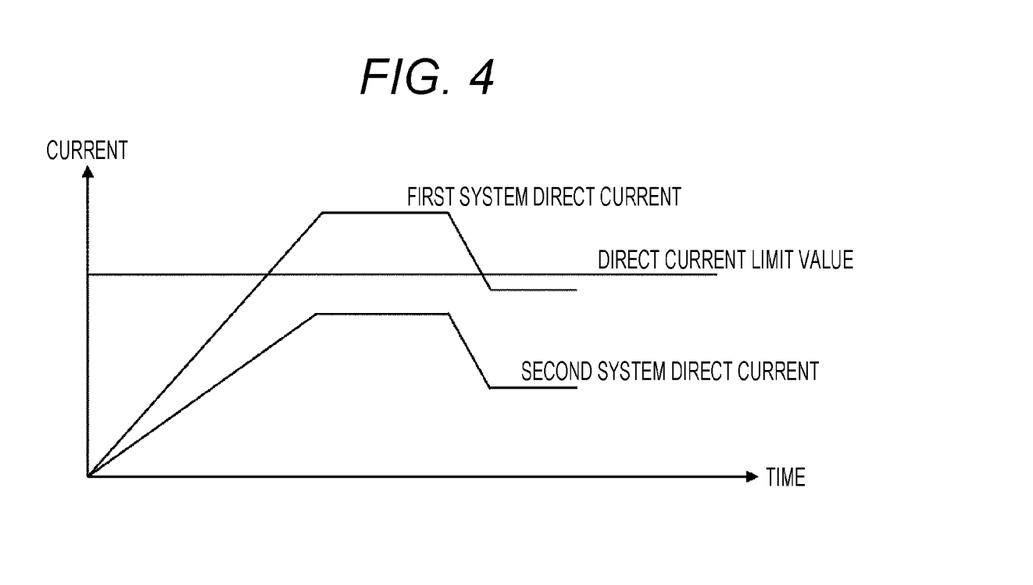
FIG. 4 is a diagram schematically illustrating a direct current from a conventional synchronous motor driving device.

FIG. 3 is a functional block diagram of the direct current limiting unit 900 in FIG. 1.

The direct current limiting unit 900 includes a q-axis current correction unit 910, takes, as inputs, an estimated value Idc^ for the direct current and a predetermined limit value Idclmt for the direct current, and calculates a q-axis current correction amount Iqcmp by means of the q-axis current correction unit 910. The calculated Iqcmp is added to the first q-axis current command Iq1*, outputted as a q-axis current command Iq*, and transmitted to the current controller 500.

The direct current limiting unit 900 and the q-axis current correction unit 910 according to the present embodiment calculate Iqcmp by using, for example, Equation (9).

$$Iqcmp = (Idclmt - Idc\hat{}) \times Kdc \qquad (9)$$

Here, Kdc is an amplification gain.

By adopting the format of Equation (9), in a case where the estimated direct current Idc^ exceeds the limit value Idclmt, the q-axis current is reduced to reduce the output, and hence the direct current can be kept at no more than the direct current limit value.

In addition, in a case where the estimated direct current Idc^ is less than the limit value Idclmt, the q-axis current is increased, and the responsiveness can be improved.

Next, an advantageous effect obtained by applying the present invention in a case where a dual three-phase motor is used as the synchronous motor 200 will be described with reference to FIGS. 4 and 5.

FIG. 4 is a diagram schematically illustrating a direct current in a case where the present invention is not applied, that is, a direct current from a conventional synchronous motor driving device.

In a case where a dual three-phase motor is used as the synchronous motor 200, a direct current flows through each of the two three-phase winding systems. At this time, if there is a variation in the winding system or the inverter element, an imbalance occurs in the direct current as illustrated in FIG. 4.

In a case where the output of the dual three-phase winding motor is limited so as to limit the direct current in a case where the first system direct current or the second system direct current exceeds the direct current limit value, the first system direct current can be suppressed to be no more than the direct current limit value, but the second system direct current, which does not require limitation, is also limited. Therefore, there is a risk of deterioration in the responsiveness.

Therefore, this problem can be solved by providing, as per the present embodiment, the synchronous motor driving device 100 and the synchronous motor driving device 100' that include the direct current estimation unit 800 and the direct current limiting unit 900.

Figure 5:
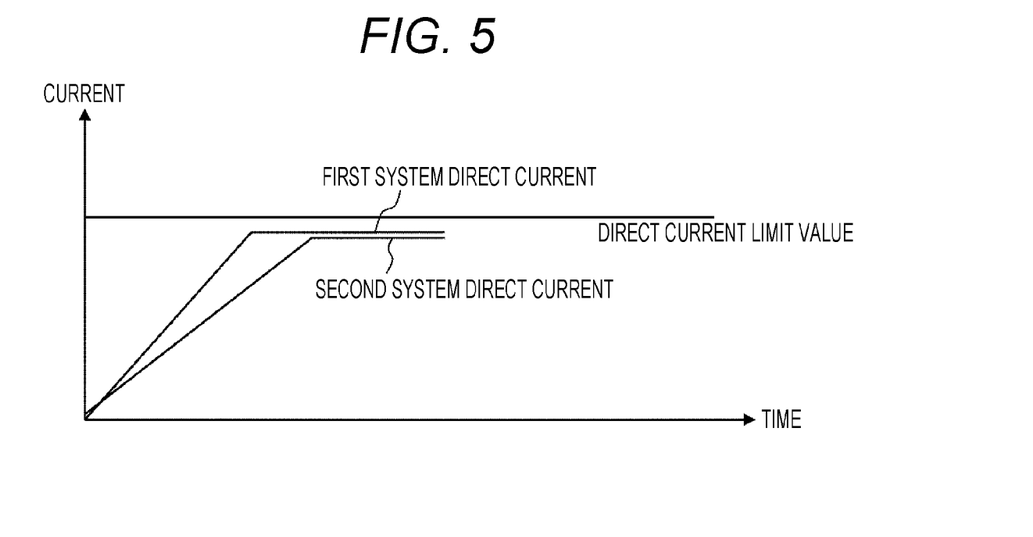
FIG. 5 is a diagram schematically illustrating a direct current from a synchronous motor driving device according to the first embodiment of the present invention.

FIG. 5 is a diagram schematically illustrating a direct current in a case where the present invention is applied to a dual three-phase motor.

Because the direct current can be accurately estimated by the direct current estimation unit 800 by taking into account the inverter efficiency information η^ that has not been considered heretofore, even if an imbalance of the direct current occurs in the first system and the second system, it is possible to suppress the direct current to be no more than the direct current limit value.

In addition, because the second system direct current not requiring limitation can be increased, responsiveness can be improved, and actuator control of an electric auxiliary machine component can be made highly responsive.

As described above, in the present embodiment, the synchronous motor driving device 100 includes the direct current estimation unit 800 and the direct current limiting unit 900. The direct current estimation unit 800 calculates the first direct current Idc1^ including the inverter efficiency information η^ and the second direct current Idc2^ not including the inverter efficiency information η^, thereby extracting the inverter efficiency information η^ and improving the direct current estimation accuracy.

Furthermore, the direct current Idc^ estimated by the direct current estimation unit 800 is inputted to the direct current limiting unit 900, and the q-axis current command Iq* is corrected by being compared with the predetermined direct current limit value Idclmt, and thus the direct current is suppressed to the limit value, and in a case where there is a margin, the output is increased to improve the responsiveness.

Further, assuming the same configuration as the synchronous motor driving device 100, when the synchronous motor driving device 100' is provided and a dual three-phase motor is used as the synchronous motor 200, in a case where there is an imbalance in the direct current, the responsiveness is improved by correcting the q-axis current command Iq* to limit the direct current exceeding the limit value and by correcting the q-axis current command Iq* to increase the direct current for which there is a limit value margin.

According to the present embodiment, it is possible to appropriately limit the direct current of the electric auxiliary machine, and thus contribute to improving the reliability of a redundant electric auxiliary machine. Further, by applying the present invention to a steering wheel or a brake device for which responsiveness is regarded as important, it is possible to provide a more responsive electric auxiliary machine, and thus contribute to improving drivability.

Second Embodiment

Figure 6:
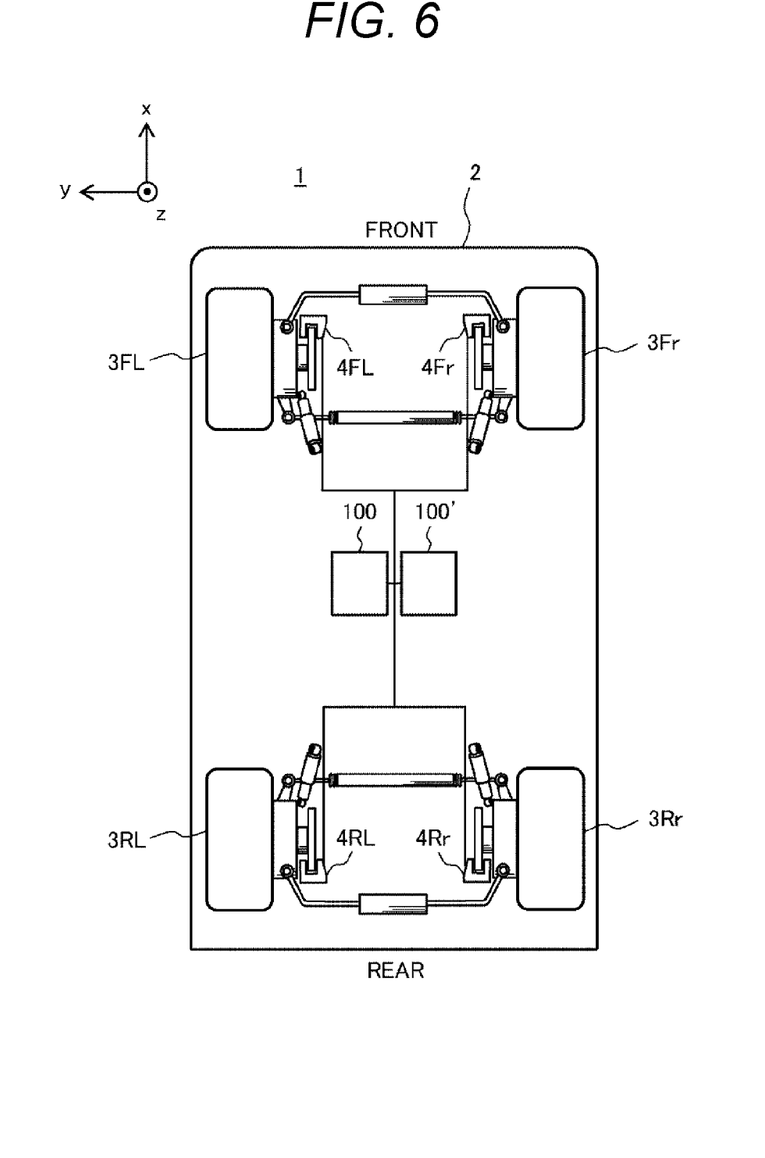
FIG. 6 is a diagram illustrating a schematic configuration of a vehicle according to a second embodiment of the present invention.

A vehicle according to a second embodiment of the present invention will be described with reference to FIG. 6. FIG. 6 is a diagram illustrating a schematic configuration of a vehicle 1 according to the present embodiment.

In the present embodiment, an example will be described in which the synchronous motor driving devices 100 and 100' disclosed in the first embodiment are mounted on a vehicle body 2, and four electric brakes for braking four wheels are integrally driven and controlled.

As illustrated in FIG. 6, the vehicle 1 according to the present embodiment includes wheels 3 and electric brakes 4 on the vehicle body 2. In addition, the synchronous motor driving devices 100 and 100' described in the first embodiment are mounted on the vehicle 1.

Note that the other components are mounted in the same manner as in a normal vehicle, but are not necessary for the description of the embodiment of the present invention, and thus descriptions thereof are omitted.

In FIG. 6, a coordinate system is represented in which the x axis (the front direction is positive) denotes a front-rear direction of the vehicle 1, the y axis (the left direction is positive) denotes a left-right direction, and the z axis (the up direction is positive) denotes an up-down direction.

Furthermore, in FIG. 6, FL is a reference sign indicating a configuration corresponding to the front left, Fr corresponds to the front right, RL corresponds to the rear left, and Rr corresponds to the rear right. Taking the wheels 3 as an example, 3FL, 3Fr, 3RL, and 3Rr are the front-left wheel, the front-right wheel, the rear-left wheel, and the rear-right wheel, respectively.

The electric brakes 4 are devices for braking the rotation of the wheels 3, and the present embodiment includes four electric brakes, namely, an electric brake 4FL for the front-left wheel 3FL, an electric brake 4Fr for the front-right wheel 3Fr, an electric brake 4RL for the rear-left wheel 3RL, and an electric brake 4Rr for the rear-right wheel 3Rr.

A dual three-phase winding motor (six-phase motor) including two three-phase windings is used as a driving synchronous motor by each of the electric brakes 4, where the synchronous motor driving device 100 supplies AC power to one three-phase winding of the two three-phase windings, and the other synchronous motor driving device 100' having the same configuration as the synchronous motor driving device 100 supplies AC power to the other three-phase winding. Thus, the dual three-phase winding motor is driven, and the wheels 3 (3FL, 3Fr, 3RL, 3Rr) are braked by the electric brakes 4 (4FL, 4Fr, 4RL, 4Rr).

The vehicle 1 according to the present embodiment is configured as described above, and by distributing the outputs of the synchronous motor driving devices 100 and 100' to the four electric brakes 4 (4FL, 4Fr, 4RL, 4Rr), the four electric brakes that respectively brake the four wheels are integrally driven and controlled.

Note that the present invention is not limited to or by the above-described embodiments and includes various modifications. For example, the above-described embodiments have been described in detail to facilitate understanding of the present invention, and are not necessarily limited to or by embodiments having all the configurations described. In addition, part of the configuration of one embodiment can be replaced with the configuration of another embodiment, and the configuration of the other embodiment can also be added to the configuration of the one embodiment. Moreover, it is possible to add other configurations to part of the configuration of each embodiment, and to delete or replace part of the configuration of the embodiments.

REFERENCE SIGNS LIST 1 vehicle
2 vehicle body
3 (3FL, 3Fr, 3RL, 3Rr) vehicle wheel
4 (4FL, 4Fr, 4RL, 4Rr) electric brake
100, 100' synchronous motor driving device
200 synchronous motor
300 current detection unit
300u, 300v, 300w current sensor
400 power converter
500 current controller
600 current command calculation unit
700 coordinate conversion unit
800 direct current estimation unit
810 first direct current calculation unit
820 second direct current calculation unit
830 model error extraction unit
831 error extraction unit
832 error correction unit
840 direct current correction unit
900 direct current limiting unit
910 q-axis current correction unit

The invention claimed is:

1. A synchronous motor driving device, comprising:
a first direct current calculation unit that calculates a first direct current on the basis of a first voltage command value, a current value of a winding of a synchronous motor, and a battery voltage;
a second direct current calculation unit that calculates a second direct current on the basis of a current value of the winding of the synchronous motor, a rotation speed of the synchronous motor, and a predetermined motor characteristic of the synchronous motor;
a model error extraction unit that calculates inverter efficiency on the basis of the first direct current and the second direct current;
a direct current correction unit that calculates an estimated direct current on the basis of the first direct current, the second direct current, and the inverter efficiency; and
a direct current limiting unit that corrects a current command value of the winding on the basis of the estimated direct current and a predetermined direct current limit value.

2. The synchronous motor driving device according to claim 1,
wherein the model error extraction unit includes an error extraction unit and an error correction unit,
wherein the error correction unit calculates the product of the second direct current and the inverter efficiency, and
wherein the error extraction unit calculates the inverter efficiency on the basis of the first direct current and an output of the error correction unit.

3. The synchronous motor driving device according to claim 1, further comprising:
a current detection unit that detects a three-phase current flowing through the synchronous motor; and
a coordinate conversion unit that converts the three-phase current into a d-axis current and a q-axis current,
wherein the first direct current calculation unit and the second direct current calculation unit use the d-axis current and the q-axis current as current values of windings of the synchronous motor.

4. The synchronous motor driving device according to claim 1,
wherein the synchronous motor is a dual three-phase winding motor that includes two three-phase windings,
wherein the synchronous motor driving device supplies AC power to one three-phase winding of the two three-phase windings, and
wherein another synchronous motor driving device having the configuration as the synchronous motor driving device same supplies AC power to the other three-phase winding to drive the synchronous motor.

5. The synchronous motor driving device according to claim 4,
wherein the synchronous motor is a six-phase motor that drives an electric brake of an automobile, and
wherein the synchronous motor driving device integrally controls four electric brakes that respectively brake four wheels of the automobile.

6. A synchronous motor driving method, comprising the steps of:

(a) calculating a first direct current on the basis of a first voltage command value, a current value of a winding of a synchronous motor, and a battery voltage;
(b) calculating a second direct current on the basis of a current value of the winding of the synchronous motor, a rotation speed of the synchronous motor, and a predetermined motor characteristic of the synchronous motor;
(c) calculating inverter efficiency on the basis of the first direct current and the second direct current;
(d) calculating an estimated direct current on the basis of the first direct current, the second direct current, and the inverter efficiency; and
(e) correcting a current command value of the winding on the basis of the estimated direct current and a predetermined direct current limit value.

7. The synchronous motor driving method according to claim 6,
wherein the step (c) includes the steps of:
(c1) calculating the product of the second direct current and the inverter efficiency; and
(c2) calculating the inverter efficiency on the basis of the first direct current and a calculation result of the step (c1).

8. The synchronous motor driving method according to claim 6, wherein a d-axis current and a q-axis current obtained by coordinate-converting a three-phase current flowing through the synchronous motor are used as the current values of the windings of the synchronous motor.

* * * * *